United States Patent

Honma et al.

[11] Patent Number: 5,866,640
[45] Date of Patent: Feb. 2, 1999

[54] HEAT CURING SILICONE RUBBER COMPOSITION

[75] Inventors: Hiroshi Honma; Takao Matsushita; Kenji Ota, all of Chiba Prefecture, Japan

[73] Assignee: Dow Corning Toray Silicone Co., Ltd., Tokyo, Japan

[21] Appl. No.: 687,746

[22] Filed: Jul. 25, 1996

[30] Foreign Application Priority Data

Jul. 27, 1995 [JP] Japan ..................... 7-211212

[51] Int. Cl.$^6$ ........................................ C08K 9/06
[52] U.S. Cl. .................. 523/212; 524/398; 524/494; 524/588
[58] Field of Search ............... 523/212; 524/398, 524/494, 588

[56] References Cited

U.S. PATENT DOCUMENTS

| | | | |
|---|---|---|---|
| 3,821,140 | 6/1974 | Milbert | 524/398 |
| 4,800,124 | 1/1989 | Davis et al. | 525/477 |
| 5,216,104 | 6/1993 | Okami et al. | 524/588 |
| 5,352,724 | 10/1994 | Fujiki et al. | 524/398 |

FOREIGN PATENT DOCUMENTS

| | | |
|---|---|---|
| 124151 | 11/1974 | Japan . |
| 126592 | 5/1995 | Japan . |

*Primary Examiner*—Mark D. Sweet
*Attorney, Agent, or Firm*—William F. Boley

[57] ABSTRACT

A silicone rubber composition having improved mold release properties comprising (A) silicone rubber base compound, (B) organopolysiloxane having no aliphatic unsaturated groups, (C) higher fatty acid or higher fatty acid metal salt, (D) water, and (E) curing agent.

14 Claims, 3 Drawing Sheets

HEAT CURING SILICONE RUBBER COMPOSITION

BACKGROUND OF INVENTION

The present invention concerns a heat curing silicone rubber composition which can be used, for example, for a wire harness sealer and connector. In more detail, the present invention concerns a heat curing silicone rubber composition having excellent mold release properties which is suitable for use for molding in a metallic mold having an intricate structure.

It is known that silicone rubber compositions lack in mold release properties. Therefore, the rubber tears when it is removed from the mold, and the mold becomes contaminated during operation over an extended period of time. A method has been formerly proposed as a means to solve this problem in which an internal mold release agent, such as stearic acid, zinc stearate, or calcium stearate is added to the silicone rubber composition (Japanese Kokai Patent Application No. Sho 49[1974]-124151). However, even in silicone rubber compositions in which an internal mold release agent is added, the mold release properties are not sufficient for obtaining silicone rubber molded products having a protruding structure and having an intricate structure, such as a hollow curved structure. The existing silicone rubber composition is not adequate particularly for the molding of multiple silicone rubber products having such intricate structures by one metallic mold. For example, with a mold designed to yield several hundred products per one shot when molding waterproof seal packing for a wire harness connector, a tremendous amount of time is required to remove the product from the mold with existing silicone rubber compositions. Therefore, poor performance in production efficiency is a factor for an increase in cost.

As a result of a search for a solution for the aforementioned problems, the inventors of the present invention have discovered that a silicone rubber composition to which water is added and mixed has excellent mold release properties, and have described this composition in Japanese Kokai Patent Application No. Hei 7[1995]-126592. They have further discovered that a silicone rubber composition, which is the composition of the aforementioned Japanese Kokai Patent Application to which a specific compound is added and mixed, has superior mold release properties and have completed the present invention. Specifically, the objective of the present invention is to offer a silicone rubber composition having excellent mold release properties which greatly exceeds the mold release properties of existing silicone rubber compositions.

SUMMARY OF INVENTION

The present invention is a silicone rubber composition having improved mold release properties. The composition comprises (A) silicone rubber base compound, (B) organopolysiloxane having no aliphatic unsaturated groups, (C) higher fatty acid or higher fatty acid metal salt, (D) water, and (E) curing agent.

DESCRIPTION OF INVENTION

Figure 1:
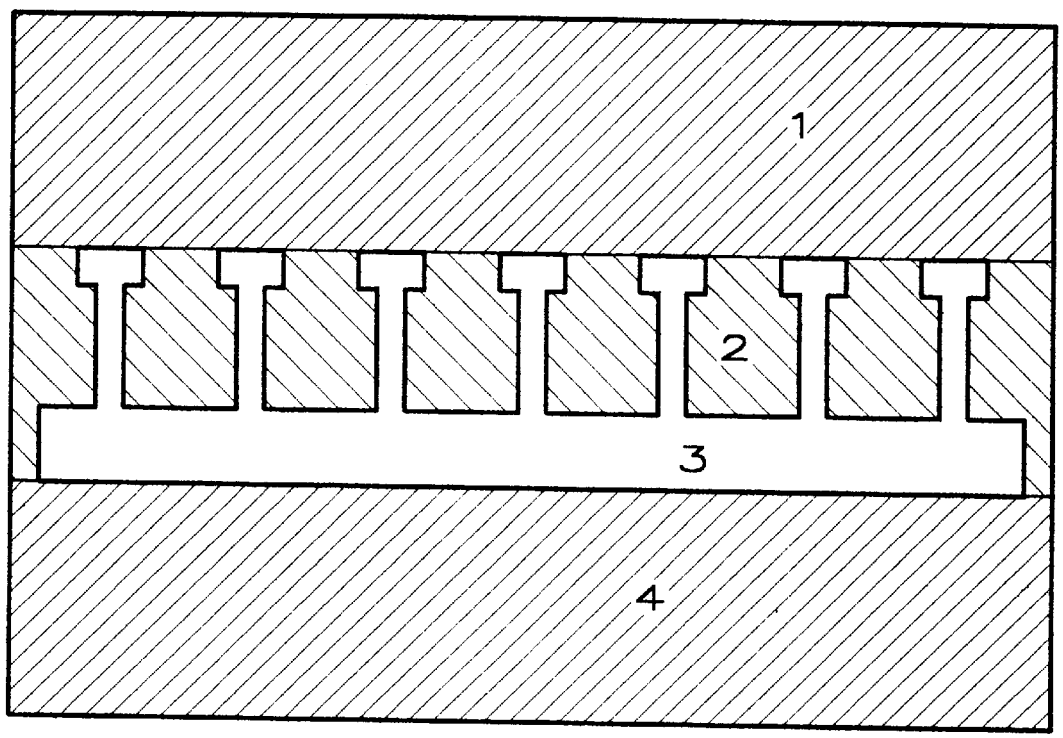
FIG. 1 is a schematic cross-sectional diagram of a metallic mold that is used to evaluate mold release properties in the application examples of the present invention.
Figure 2:
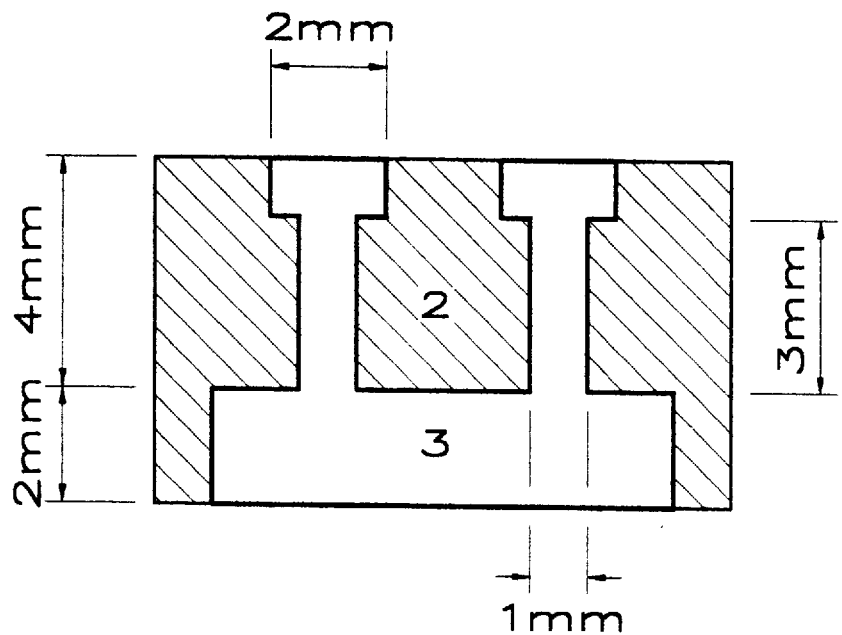
FIG. 2 is an enlarged schematic cross-sectional diagram of the projecting parts of the middle metallic mold in FIG. 1.

The present invention is a heat curing silicone rubber composition comprising:
(A) 100 parts by weight of a silicone rubber base compound comprising (a) 100 parts by weight of a first organopolysiloxane described by average unit formula

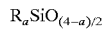
$$R_a SiO_{(4-a)/2}$$

where R is a substituted or unsubstituted monovalent hydrocarbon group and a is a value of 1.95 to 2.05 and (b) 10 to 100 parts by weight of reinforcing filler,
(B) 1 to 20 parts by weight of a second organopolysiloxane described by formula

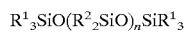
$$R^1_3 SiO(R^2_2 SiO)_n SiR^1_3$$

where $R^1$ and $R^2$ are identical or different substituted or unsubstituted monovalent hydrocarbon groups, not including aliphatic unsaturated groups, and n is an integer with a value of 0 to 1000,
(C) 0.025 to 5 parts by weight of a higher fatty acid or higher fatty acid metal salt,
(D) 0.05 to 5 parts by weight of water, and
(E) a curing agent in an amount sufficient for curing the composition.

To explain this, the silicone rubber base compound comprising component (A) of the present invention is the main component in the silicone rubber composition, and is widely known. The first organopolysiloxane (component (a)) which is used in the silicone rubber base compound contains substituents R, where R can be a substituted or unsubstituted monovalent hydrocarbon group. R can be, for example, alkyl groups such as methyl, ethyl, and propyl; alkenyl groups, such as vinyl and allyl; cycloalkyl groups such as cyclohexyl; aralkyl groups such as b-phenylethyl; aryl groups such as phenyl; and alkyl halide groups such as chloromethyl, 3-chloropropyl, and 3,3,3-trichloropropyl. In the formula for the first organopolysiloxane, a is 1.95 to 2.05.

The molecular weight of the first organopolysiloxane is not particularly limited and can be those used in the industry for such applications. Generally, those organopolysiloxanes having a viscosity above 107 mPa•s at 25° C. or greater and an average molecular weight of 25×10⁴ or greater are ideal for use. Examples of the component (a) include dimethylsiloxane/methyl vinylsiloxane copolymer with both chain ends blocked by trimethylsiloxy groups, dimethylsiloxane/methylvinylsiloxane copolymer with both chain ends blocked by dimethylvinylsiloxy groups, and dimethylpolysiloxane with both chain ends blocked by dimethylvinylsiloxy groups.

The reinforcing filler, component (b), has been used in existing silicone rubber base compounds, and examples include reinforcing fine powder silica and carbon black. Fumed silica and precipitation silica are examples of the reinforcing fine powder silica. From these, super fine powder silica having a particle diameter of 50 mμ or less and a relative surface area of 100 m²/g or greater is preferred. Also, preferred are the reinforcing fine powder silicas whose surface is pretreated with, for example, organosilane, organodisilazane, or diorganocyclopolysiloxane. Carbon black can be used to provide the silicone rubber with conductivity, and examples include acetylene black, Ketjen Black, furnace black, and thermal black.

The second organopolysiloxane (component (B)) used in the present invention is a component for providing a silicone rubber molded product with lubricating ability and also a component for providing it with mold release properties. In the formula for component (B) $R^1$ and $R^2$ are substituted or unsubstituted monovalent hydrocarbon groups not having aliphatic unsaturated bonds. Specific examples of $R^1$ and $R^2$ include alkyl groups such as methyl, ethyl, and propyl; cycloalkyl groups such as cyclohexyl; aralkyl groups such as β-phenylethyl; aryl groups such as phenyl; and alkyl halide groups, such as chloromethyl, 3-chloropropyl, and 3,3,3-trifluoropropyl. In the present invention is it preferred that $R^2$ is either an alkyl group or phenyl group, and at least 5 mol % of $R^2$ is a phenyl group, and more preferred when at least 20 mol % of $R^2$ is a phenyl group. Examples of component (B) are dimethylpolysiloxane with both chain ends blocked by trimethylsiloxy groups, dimethylsiloxane/phenylmethylsiloxane copolymer with both chain ends blocked by trimethylsiloxy groups, and dimethylsiloxane/diphenylsiloxane copolymer with both chain ends blocked by trimethylsiloxy groups.

The second organopolysiloxane, component (B), is directly added and mixed into the silicone rubber base compound comprising component (A). The mixing amount of component (B) is 1 to 20 parts by weight per 100 parts by weight of component (A). This is because the adhesion of the silicone rubber composition increases and the roll-mill processibility decreases when the mixing amount exceeds 20 parts by weight of component (B). Conversely, the bleeding amount of the second organopolysiloxane is not sufficient after molding, and it is difficult to obtain the lubricating ability when it is less than 1 part by weight.

The higher fatty acid or higher fatty acid metal salt, component (C), used in the present invention is a necessary component for providing the mold release properties. Its effect is further improved by a synergetic effect through a combined use with water as component (D). Specific examples of the higher fatty acids are lauric acid, stearic acid, palmitic acid, oleic acid, and arachic acid. Examples of the higher fatty acid metal salts are magnesium stearate, calcium stearate, zinc stearate, cobalt stearate, aluminum stearate, barium stearate, zinc laurate, barium laurate, magnesium laurate, calcium laurate, zinc oleate, magnesium oleate, and manganese oleate. The mixing amount of component (C) added to the composition is within a range of 0.025 to 5 parts by weight of the silicone rubber base compound (component (A)). Properties of the silicone rubber (particularly heat resistance and compression set) are lowered when the amount of component (C) is too high, and target mold release properties cannot be obtained when it is too low.

Water, component (D), used in the present invention is considered necessary for providing mold release properties. This component greatly improves the mold release properties in combination with the aforementioned component (B) and component (C).

The mixing amount of component (D) is 0.05 to 5 parts by weight per 100 parts by weight of component (A). This is because voids are easily formed within the silicone rubber molded product when the mixing amount exceeds 5 parts by weight, and a significantly improvement of the mold release properties is not obtained when it is less than 0.05 part by weight.

The curing agent, component (E), used in the present invention cures the composition of the present invention when heated into a silicone rubber. Organic peroxides are generally used as the curing agent. Also, when the organopolysiloxane of component (A) includes alkenyl groups, it is possible to use an organohydrogenpolysiloxane in which there is silicon-hydrogen bonding, as a crosslinker, in combination with a platinum catalyst to effect curing of the composition. The mixing amount of the curing agent should be in an amount sufficient for curing the composition of the present invention.

Examples of useful organic peroxide curing agents include dicumyl peroxide, di-t-butyl peroxide, t-butyl cumyl peroxide, 2,5-dimethyl-2,5-di(t-butylperoxy)hexane, 2,5-dimethyl-2,5-di(benzoylperoxy), 2,5-dimethyl-2,5-di(t-butylperoxy)-3,3,5-trimethylcyclohexane, and benzoyl peroxide. The mixing amount of the organic peroxide is generally within the range of 0.1 to 10 parts by weight per 100 parts by weight of component (A).

Examples of the organohydrogenpolysiloxane crosslinker include methylhydrogenpolysiloxane with both chain ends blocked by trimethylsiloxy groups, dimethylsiloxane/methylhydrogensiloxane copolymer with both chain ends blocked by trimethylsiloxy groups, and dimethylsiloxane/methylhydrogensiloxane copolymer with both chain ends blocked by dimethylhydrogensiloxy groups.

Examples of useful platinum catalysts are chloroplatinic acid, an alcohol solution of chloroplatinic acid, a complex of chloroplatinic acid and divinyltetramethylsiloxane, platinum black, and a thermoplastic resin fine powder catalyst including a platinum compound. The mixing amount of the organohydrogenpolysiloxane is an amount such that the ratio between the number of moles of silicon-hydrogen bonds included within the organohydrogenpolysiloxane and the number of moles of alkenyl groups within component (A) is established at 0.5:1 to 20:1. The mixing amount of the platinum catalyst can be within the range of 0.1 to 500 parts by weight platinum per 1,000,000 parts by weight of organopolysiloxane present in the composition in the present invention.

The silicone rubber composition of the present invention is made of the aforementioned components (A) through (E). However, it is acceptable to add and mix conventional additives, that have been used in conventional silicone rubber compositions, including inorganic fillers such as diatomaceous earth, quartz powder, calcium carbonate, mica, aluminum oxide, aluminum hydroxide, zinc oxide, magnesium oxide, and titanium oxide and heat resistant agents such as rare-earth oxides, rare earth hydroxide, cerium silanolate, and cerium fatty acid salts, as long as the purpose of the present invention is not lost.

The silicone rubber composition of the present invention can be easily obtained by simply mixing components (A) through (E) evenly. Particularly, it is desirable to mix 100 parts by weight of a first organopolysiloxane as component (a) into 10 to 100 parts by weight of reinforcing filler as component (b) in order to form a silicone rubber base compound designated as component (A). Then it is desirable to mix sequentially into each 100 parts of component (A): 1 to 20 parts by weight of a second organopolysiloxane as component (B), 0.025 to 5 parts by weight of a higher fatty acid or a higher fatty acid metal salt as component (C), 0.05 to 5 parts by weight of water as component (D) and 0.1 to 10 parts by weight of a curing agent as component (E).

In some cases, it is difficult to mix water as component (D) into the silicone rubber composition. In such cases, a mixture of water and silica fine powder is prepared beforehand, and this is preferably added and mixed into a mixture of components (A) through (C). In such a case, the mixing ratio of water and silica fine powder is desirably 1 to 100 parts by weight of silica fine powder per 100 parts by weight of water, and it is most preferable at 5 to 20 parts by weight of silica fine powder per 100 parts by weight of water.

The silicone rubber composition of the present invention has excellent mold release properties. Therefore, the silicone rubber molded product does not chip or tear during removal from the mold, even when it is applied to a metallic mold having an intricate structure. Also, productivity of the molding process increases greatly due to easy removal of the moldings from the mold. Accordingly, the present composition is very useful as a silicone rubber composition for press molding, transfer molding, and injection molding, for example, in those applications where metallic molds having an intricate structure are used. The present composition is particularly effective for a molding a connector and sealer such as a wire harness sealer and connector.

The present invention is further explained by reference to the following examples. In the examples, parts refer to parts by weight, the viscosity indicates a value measured at 25° C. The mold release properties in the examples are evaluated in the manner described below.

Evaluation Method 1. A silicone rubber composition was pressure molded using a metallic mold having projections (the number of projections was 77) as illustrated in FIG. 1. The silicone rubber molded product obtained was pulled out by force after molding, and the number of projections tearing from the molded product and remaining in the mold were count. The number of projection remaining in the mold are report as a ratio to the total No. of projections (i.e. 77) in Tables I, II, and III under the heading "Defect Ratio".

Figure 3:
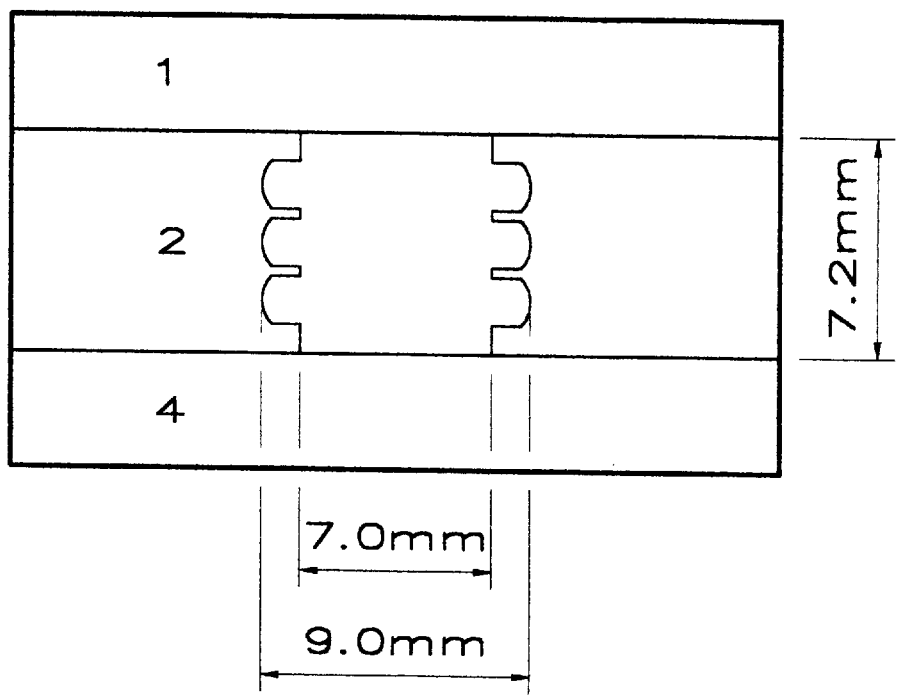
FIG. 3 is a schematic diagram of a metallic mold which is used to evaluate mold release properties in the application examples of the present invention. In the Figures, element 1 is the upper mold, element 2 is the middle mold, element 3 is a cavity, and element 4 is the lower mold.

Evaluation Method 2. A silicone rubber composition was pressure molded using a metallic mold as illustrated in FIG. 3, the upper metallic mold and the lower metallic mold were removed after molding, and the molded product within the middle mold was removed from the middle mold by extrusion using a cylindrical shaped (diameter of 5 mm) metallic bar. The load required for this removal from the mold was read using a digital measuring device and is shown as the mold removing load (kg) in Tables I, II, III under the heading "Removing Load".

Application Example 1. 100 parts of an organopolysiloxane with both chains ends blocked by dimethylvinylsiloxy groups (degree of polymerization of 5,000) consisting of 99.85 mol % dimethylsiloxy units and 0.15 mol % methylvinylsiloxy units, 5.0 parts of a dimethylsiloxane with both chain ends blocked by silanol groups having a viscosity of 60 mPa•s, and 40 parts by weight of wet process silica with a relative surface area of 130 m²/g were placed into a mixer and mixed with heating to prepare a silicone rubber base compound (denoted in Table I as "base". After cooling, 8 parts of dimethyl siloxane/phenylmethylsiloxane copolymer with both chain ends blocked by trimethylsiloxy groups (the copolymer comprised 50 mol % phenylmethylsiloxy units and had a viscosity of 128 mPa•s) and 0.2 part of zinc stearate were mixed into 100 parts of this silicone rubber base compound using a two-roll mill. Water in the amount indicated in Table I was added and mixed into this composition. Here, water was added and mixed under conditions in which 10 parts of dry process silica with a relative surface area of 200 m²/g were added in paste form into 90 parts of water. Then, 0.4 part of 2,5-dimethyl-2,5-di(t-butylperoxy) hexane was added and mixed to prepare a heat curing silicone rubber composition. The mold release properties of these heat curing silicone rubber compositions were measured, and the results are shown in Table I.

For comparison, a heat setting silicone rubber composition was prepared in the same manner as above, except that water was not added (Comparative Example 1).

Also, a heat setting silicone rubber composition was prepared in the same manner as above, except that the dimethylsiloxane/phenylmethylsiloxane copolymer was not added (Comparative Example 2). Furthermore, another heat setting silicone rubber composition was prepared in the same manner as above, except that zinc stearate was not added (Comparative Example 3). The mold release properties of these compositions were measured, and the results are also shown in Table I.

TABLE I

| | Application Examples | | | Comparative Examples | | |
|---|---|---|---|---|---|---|
| Component | 1-1 | 1-2 | 1-3 | 1-1 | 1-2 | 1-3 |
| | (Parts by Weight) | | | | | |
| Base | 100 | 100 | 100 | 100 | 100 | 100 |
| Dimethylsiloxane/ Phenylmethylsiloxane Copolymer | 8 | 8 | 8 | 8 | 0 | 8 |
| Zinc Stearate | 0.2 | 0.2 | 0.2 | 0.2 | 0.2 | 0 |
| Water | 0.9 | 0.45 | 0.23 | 0 | 0.9 | 0.9 |
| | Mold Release Characteristics | | | | | |
| Defect Ratio | 0/77 | 0/77 | 3/77 | 26/77 | 3/77 | 3/77 |
| Removing Load (kg) | 6.8 | 6.7 | 8.3 | 10.8 | 9.5 | 9.1 |

Application Example 2. A heat setting silicone rubber composition was prepared in the same manner as in Application Example 1, except that the mixing amount of the dimethylsiloxane with both chain ends blocked by silanol groups as described in Application Example 1 was 10.0 parts, and 40 parts of dry process silica with a relative surface area of 200 m²/g were mixed instead of 40 parts of wet process method silica. The mold release properties of this composition were measured, and the results are shown in Table II.

For comparison, a heat setting silicone rubber composition was prepared in the same manner as above, except that water was not added and mixed. The mold release properties of this composition were measured, and the results are also shown in Table II.

TABLE II

| | Application Examples | | | Comparative Example |
|---|---|---|---|---|
| Component | 2-1 | 2-2 | 2-3 | 2 |
| | (Parts by Weight) | | | |
| Base | 100 | 100 | 100 | 100 |
| Dimethylsiloxane/Phenyl-methylsiloxane Copolymer | 8 | 8 | 8 | 8 |
| Zinc Stearate | 0.2 | 0.2 | 0.2 | 0.2 |
| Water | 0.9 | 0.45 | 0.23 | 0 |
| | Mold Release Characteristics | | | |
| Defect Ratio | 0/77 | 0/77 | 2/77 | 24/77 |
| Removing Load (kg) | 6.0 | 6.3 | 7.5 | 10.0 |

Application Example 3. A silicone rubber base compound was prepared by mixing 50 parts of the silicone rubber base compound obtained in Application Example 1 into 50 parts of the silicone rubber base compound obtained in Application Example 2 on a two-roll mill. 8 parts of the dimethylsiloxane/phenylmethylsiloxane copolymer with both chain ends blocked by trimethylsiloxy groups (the copolymer comprised 50 mol % phenylmethylsiloxy units, and the viscosity was 128 mPa•s) and 0.2 parts of zinc stearate were mixed into 100 parts of this silicone rubber compound on a two-roll mill. Water was added and mixed into this composition in the same manner as in Application Example 1. Then, 0.4 part of 2,5-dimethyl-2,5-di(t-butylperoxy)hexane was added and mixed to prepare a heat cure silicone rubber composition was prepared. The mold release properties of these compositions were measured, and the results are shown in Table III.

TABLE III

| Component | Application Examples | | | Comparative Example |
| --- | --- | --- | --- | --- |
| | 3-1 | 3-2 | 3-3 | 3 |
| (Parts by Weight) | | | | |
| Base | 100 | 100 | 100 | 100 |
| Dimethylsiloxane/Phenyl-methylsiloxane Copolymer | 8 | 8 | 8 | 8 |
| Zinc Stearate | 0.2 | 0.2 | 0.2 | 0.2 |
| Water | 0.9 | 0.45 | 0.23 | 0 |
| Mold Release Characteristics | | | | |
| Defect Ratio | 0/77 | 0/77 | 2/77 | 29/77 |
| Removing Load (kg) | 6.4 | 6.5 | 7.7 | 10.0 |

I claim:
1. A heat curing silicone rubber composition comprising:
   (A) 100 parts by weight of a silicone rubber base compound comprising (a) 100 parts by weight of a first organopolysiloxane described by average unit formula

$R_a SiO_{(4-a)/2}$, where each R is independently selected from the group consisting of unsubstituted monovalent hydrocarbon groups and halide substituted alkyl groups and a is a value of 1.95 to 2.05 and (b) 10 to 100 parts by weight of reinforcing filler,
   (B) 1 to 20 parts by weight of a second organopolysiloxane described by formula $R^1_3 SiO(R^2_2 SiO)_n SiR^1_3$, where each $R^1$ and $R^2$ are independently selected from the group consisting of halide substituted alkyl groups and unsubstituted monovalent hydrocarbon groups not containing aliphatic unsaturated bonds, and n is an integer with a value of 0 to 1,000,
   (C) 0.025 to 5 parts by weight of a higher fatty acid or higher fatty acid metal salt,
   (D) 0.05 to 5 parts by weight of water, and
   (E) a curing agent in an amount sufficient for curing the composition.
2. A heat curing silicone rubber composition according to claim 1, where the first organopolysiloxane has a viscosity above 107 mPa•s at 25° C.
3. A heat curing silicone rubber composition according to claim 1, where the reinforcing silica filler is a super fine powder silica having a particle diameter of 50 m$\mu$ or less and a relative surface area of 100 m²/g or greater.
4. A heat curing silicone rubber composition according to claim 3, where the reinforcing silica filler is pretreated with a treating agent selected from a group consisting of organosilane, organodisilazane, and diorganocyclopolysiloxane.
5. A heat curing silicone rubber composition according to claim 1, where $R^1$ is an alkyl group and $R^2$ is an alkyl group or a phenyl group and at least 5 mole percent of $R^2$ is a phenyl group.
6. A heat curing silicone rubber composition according to claim 5, where $R^1$ is methyl and $R^2$ is methyl or phenyl.
7. A heat curing silicone rubber composition according to claim 1, where $R^1$ is an alkyl group and $R^2$ is an alkyl group or a phenyl group and at least 20 mole percent of $R^2$ is a phenyl group.
8. A heat curing silicone rubber composition according to claim 7, where $R^1$ is methyl and $R^2$ is methyl or phenyl.
9. A heat curing silicone rubber composition according to claim 1, where component (C) is zinc stearate.
10. A heat curing silicone rubber composition according to claim 1, where the curing agent is an organic peroxide.
11. A heat curing silicone rubber composition according to claim 10, where the organic peroxide is 2,5-dimethyl-2,5-di(t-butylperoxy)hexane.
12. A heat curing silicone rubber composition according to claim 10 comprising 0.1 to 10 parts by weight of the organic peroxide per 100 parts by weight of component (A).
13. A heat curing silicone rubber composition according to claim 1, where the curing agent is an organohydrogensiloxane in combination with a platinum catalyst.
14. A heat curing silicone rubber composition according to claim 13, where the platinum catalyst is selected from a group consisting of chloroplatinic acid, an alcohol solution of chloroplatinic acid, a complex of chloroplatinic acid and divinyltetramethylsiloxane, platinum black, and a thermoplastic resin fine powder catalyst comprising a platinum compound.

* * * * *